United States Patent [19]

Schwartz et al.

[11] Patent Number: 5,471,984

[45] Date of Patent: Dec. 5, 1995

[54] CINE PROTECT FOR DATA COLLECTION

[75] Inventors: David R. Schwartz; Richard M. Lee, both of Bellevue, Wash.

[73] Assignee: Siemens Medical Systems, Inc., Iselin, N.J.

[21] Appl. No.: 130,041

[22] Filed: Sep. 30, 1993

[51] Int. Cl.$^6$ .............................. A61B 5/00; A61B 8/00
[52] U.S. Cl. ..................... 128/630; 128/660.07
[58] Field of Search ............... 128/630, 660.01, 128/660.05, 660.07, 660.01; 73/626; 364/413.25; 382/6, 41

[56] References Cited

U.S. PATENT DOCUMENTS

| | | | |
|---|---|---|---|
| 3,954,098 | 5/1976 | Dick et al. | 128/660.07 X |
| 4,271,842 | 6/1981 | Specht et al. | 128/660.07 |
| 4,463,763 | 8/1984 | Koyano et al. | 128/660.07 X |
| 4,572,202 | 2/1986 | Thomenius | 128/660.07 |
| 5,090,413 | 2/1992 | Yoshioka | 128/660.05 X |
| 5,099,847 | 3/1992 | Powers et al. | 128/660.07 |
| 5,125,409 | 6/1992 | Kajino et al. | 128/661.06 X |
| 5,152,290 | 10/1992 | Freeland | 128/661.04 X |
| 5,224,481 | 7/1993 | Ishikara et al. | 128/660.07 |
| 5,235,859 | 7/1994 | Ishihara et al. | 128/660.07 |

*Primary Examiner*—Francis Jaworski

[57] ABSTRACT

Collection of data that requires subsequent analysis can be accelerated by first storing the segments of data needed for analysis and later performing that analysis. In one embodiment a dynamic representation of a region is generated as a series of image data frames from frames stored in a memory in accordance with a data protection interval which is prospectively or retrospectively determined, with storage and data protection carried out without interruption of the continuing, dynamic representation of the region.

6 Claims, 1 Drawing Sheet

5,471,984

CINE PROTECT FOR DATA COLLECTION

FIELD OF THE INVENTION

This invention relates generally to data storage. Specifically, the invention relates to the acquisition and storage of ultrasound data.

BACKGROUND OF THE INVENTION

When acquiring acoustic data with an ultrasound imaging apparatus, the operator may occasionally wish to save certain data for analysis. However, the volume of data is high—there may be more than thirty frames per second—and the storage requirements per frame, being that the data are acoustic, are also quite high. Typically, the operator will acquire several ultrasound images, conduct measurements of the data from one or two particular images, update a report, and then move on to the next region of clinical interest.

This is a cyclical process. If the storage and analysis operation is repeated continuously, the examination process will be prolonged and the patient will be inconvenienced, having to wait until each frame has been analyzed before being released.

It would be desirable to provide some way of capturing acoustic data in variable-size operator-selected portions, allowing all of the required images to be collected prior to their analysis. This would allow the examiner to focus exclusively on data acquired and limit the amount of required patient time.

SUMMARY OF THE INVENTION

These and other objects are achieved by a method of cine or data protection. Instead of collecting data on a first-in, first-out basis, or a first-in, last-out basis, both of which are seriously limited by the size of memory, this method allows the operator to select and protect portions of data for later analysis, preventing the system from writing over such selected data. The total amount of data that can be saved is limited only by the overall size of the memory. After all of the desired data have been acquired, then the operator or some other person can perform the necessary analysis.

In one arrangement, the quantity of each selection is fixed and the operator can retrospectively select that portion immediately preceding the act of selection. In other variations of this method, the selection can be prospective, or both retrospective and prospective.

A refinement of this method allows the operator to vary the size of the selection. Where data comes in units such as frames, the number of frames selected can be changed from one to n number. Alternatively, the operator may elect to size the stored block of frames in terms of time increments.

Another refinement provides automatic triggering of the selection. The triggering can occur based on some external or internal signal. In a medical ultrasound application, this triggering signal can be related to the heartbeat of the patient.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
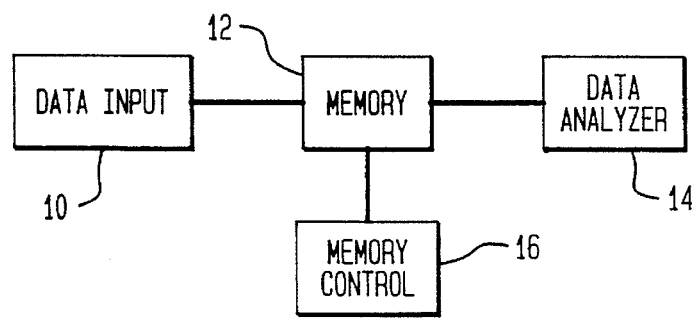
FIG. 1 is a block diagram of a data acquisition and protection system.

A system for acquiring, protecting, and analyzing data is shown in the block diagram of FIG. 1. A data input 10 performs the function of data acquisition. In the context of a medical ultrasound imaging apparatus, this would be a transducer. It should be understood that this invention applies to any kind of data that is serially acquired. The data input 10 sends the data to a memory 12 for storage until it can be provided to a data analyzer 14 to be utilized in accordance with the needs of the user. A memory control 16 manages the data stored in the memory 12. Although data are continuously flowing into the memory 12, only a finite amount can be saved. To permit the user to complete the data acquisition phase prior to performing any analysis, the user must decide what data must be preserved. The memory control 16 acts to protect those sections of the memory 12 containing the desired data from overwrite.

The memory 12 can be viewed as a continuously-filling block, such as a first-in, first-out (FIFO) memory. The memory 12 will continue to accept new data, writing over the oldest data unless instructed to skip designated locations. This can be done with a look-up table or some other suitable means. The protection step can be on user demand or based on some other trigger, e.g., heartbeat of the patient. The actual selection can be delayed until a time relative to the occurrence of the trigger signal.

Figure 2:
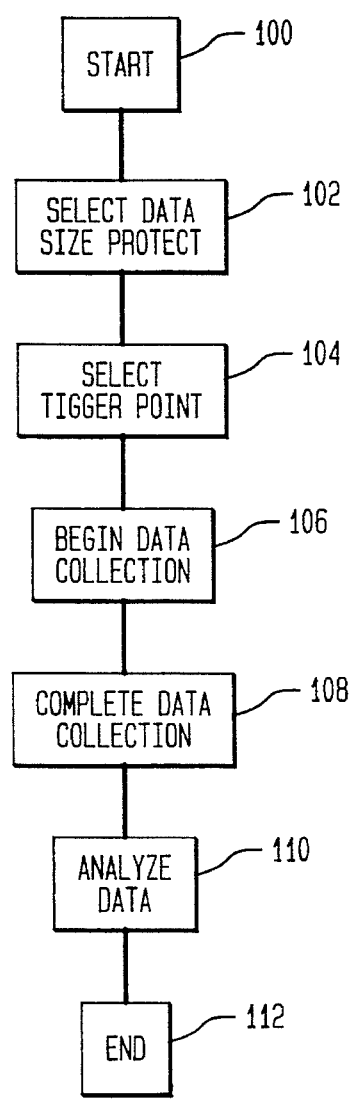
FIG. 2 is a flow chart illustrating the operation of the invention.

The actual operation of the apparatus is shown in the flowchart of FIG. 2. (The reference numerals in parentheses correspond to the steps in the flowchart.) At the start (100), the size of each protected unit of memory must be chosen (102). This can be done either before or during an actual test, depending on how the memory control 16 is configured. The data protected can be retrospective, prospective, or both. Next, the trigger point must be selected (104). This can be on operator demand or by some preset method, as noted above.

Next, data are collected, during which the protection will occur in accordance with the prearranged parameters of triggering and size (106). Alternatively, the operator may elect to size the stored block of frames in terms of time increments. Minimum time equates to a single frame and maximum time equates to the capacity of the memory. After the data collection is completed (108), the protected data can be analyzed (110), and the sequence is completed (112).

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A method for processing images comprising the following steps:

A. generating a dynamic representation of a region as a series of image data frames;

B. continuously storing the series of image data frames in a memory and overwriting in the memory only unprotected stored frames when the memory is filled;

C. preselecting a data protection interval;

D. indicating at least one trigger event; and

E. when each trigger event is indicated, storing the corresponding data frames that fall within the data protection interval as protected frames in protected memory positions, without interruption of the dynamic representation of the region.

2. A method as defined in claim 1, in which the data protection interval is a predetermined number of image data frames.

3. A method as defined in claim 1, in which the data protection interval is a predetermined period of time.

4. A method as defined in claim 1, in which the region is a portion of a patient's body and the step of generating a dynamic representation of the region comprises scanning the region with ultrasonic signals.

5. A method as defined in claim 4, in which the step of indicating the trigger event comprises user activation of a memory control device.

6. A system for processing images comprising:

A. data input means for generating a dynamic representation of a region as a series of image data frames;

B. a memory;

C. memory control means:
 1) for continuously storing the series of image data frames in the memory and overwriting in the memory only unprotected stored frames when the memory is filled;
 2) for inputting a user-selected data protection interval;
 3) for sensing at least one user-indicated trigger event; and
 4) for each trigger event, storing the corresponding data frames that fall within the data protection interval as protected frames in protected memory positions, without interruption of the dynamic representation of the region; and D. data analysis means for predefined processing of the protected frames.

\* \* \* \* \*